F. C. HALL.
FRAME OF DYNAMO ELECTRIC MACHINES.
APPLICATION FILED JUNE 9, 1910.

1,059,048.

Patented Apr. 15, 1913.

WITNESSES:
Fred H. Miller

INVENTOR
Fred C. Hall
BY
Wesley G. Carr
ATTORNEY

UNITED STATES PATENT OFFICE.

FRED C. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

FRAME OF DYNAMO-ELECTRIC MACHINES.

1,059,048. Specification of Letters Patent. Patented Apr. 15, 1913.

Application filed June 9, 1910. Serial No. 566,116.

*To all whom it may concern:*

Be it known that I, FRED C. HALL, a citizen of the United States, and a resident of Wilkinsburg, in the county of Allegheny and State of Pennsylvania, have invented a new and useful Improvement in Frames of Dynamo-Electric Machines, of which the following is a specification.

My invention relates to dynamo electric machines and particularly to such machines as are provided with stationary segmental frames.

The object of my invention is to provide a simple and inexpensive means for securely holding the segments of a frame together that shall require a minimum expenditure of labor upon the frame casting itself.

Frame segments for dynamo-electric machines have usually been fastened together by a plurality of bolts which are either unsightly or are not readily accessible.

According to my present invention, I provide a simple means for clamping the parts of a frame together which is inconspicuous and is, at the same time, readily accessible and requires a minimum amount of machine work on the frame segments.

Figure 1:
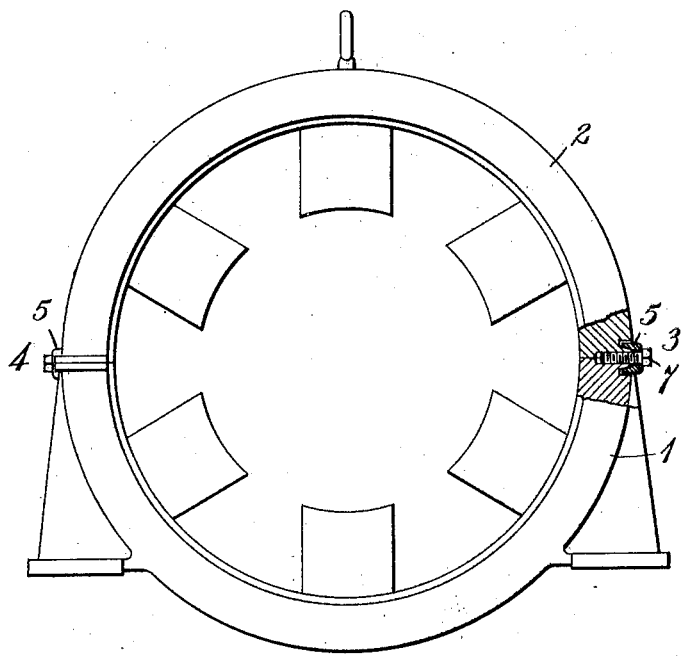
Figure 2:
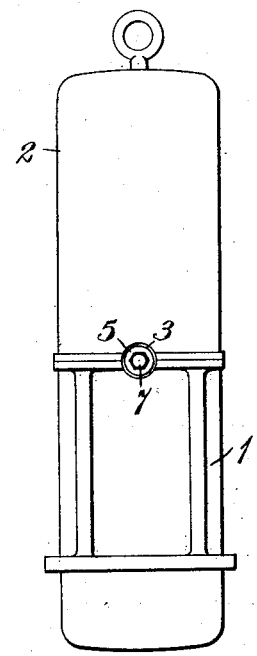
Figure 3:
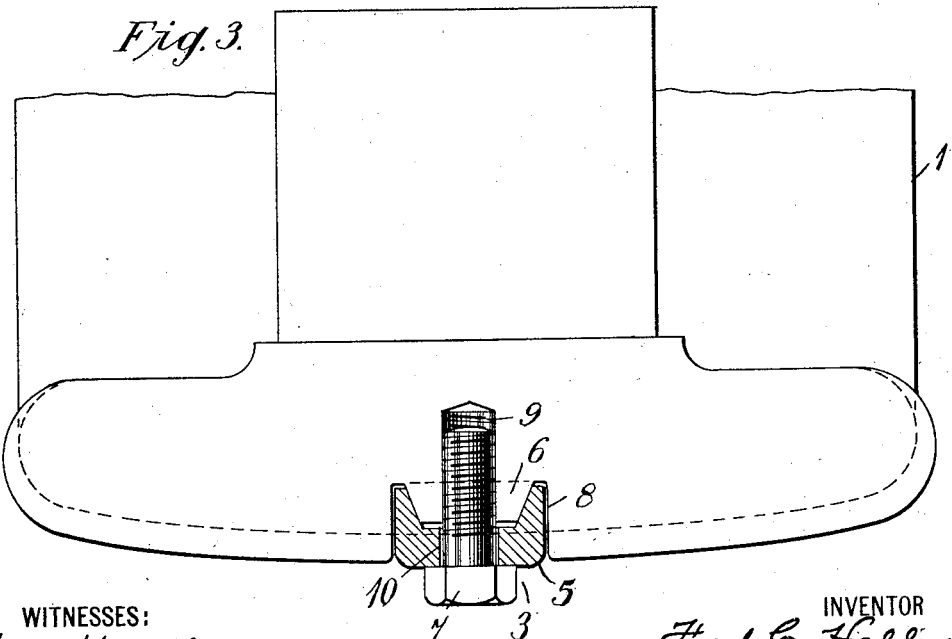

Figure 1, of the accompanying drawings, is a partially sectional elevation of a field magnet frame of a dynamo-electric machine embodying my invention. Fig. 2 is an end elevation of the machine shown in Fig. 1, and Fig. 3 is a plan view, on a larger scale, of a portion of one of the segments and disclosing one of the engaging surfaces and a transverse section of my clamping device.

Referring to the drawings, the structure here shown is a field magnet frame of a dynamo-electric machine having a base section 1 and a top section 2 which are joined together by a pair of clamping devices 3 and 4. Each of the clamping devices consists of a cup shaped member or cap 5, a frusto-conical projection 6 comprising two parts which pertain to the respective frame segments 1 and 2 and a bolt 7. The projection 6 is formed by an annular groove 8 which is cut, after the segments are assembled, by means of a milling machine or other suitable device. The inside wall of the member 5 is made to conform to the outer surface of the projection 6 in order to hold the two parts firmly together when the said member is forced inward by the bolt 7 which extends through it and screws into a hole 9 in the frame. The hole 10 in the member 5, through which the bolt extends, and the hole 9 are preferably concentric with the member 5 and the projection 6.

Such modification or duplication of parts of the clamping structure as does not materially change the mode of operation or result, I desire to have included within the scope of the appended claims.

I claim as my invention:

1. In a dynamo-electric machine, the combination with a segmental frame having an annular groove cut in adjacent segments to provide a frusto-conical divided projection, of a cup shaped member adapted to receive said divided projection and means for forcing said member inwardly to clamp the frame segments together.

2. In a dynamo-electric machine, the combination with a segmental frame having an annular groove cut in adjacent segments to provide a divided frusto-conical projection, of a cup shaped member adapted to receive said divided projection, and a bolt extending through the said member and screwed into the projection to draw the two frame segments together by forcing the member inward upon the projection.

3. A two part dynamo-electric machine frame, the sections of which are provided with adjacent inset tapered projections, in combination with caps for said projections and bolts for forcing said caps inwardly along the taper faces of said projections.

In testimony whereof, I have hereunto subscribed my name this 26th day of May, 1910.

FRED C. HALL.

Witnesses:
 M. CLARA MERZ,
 B. B. HINES.

Copies of this patent may be obtained for five cents each, by addressing the "Commissioner of Patents Washington, D. C."